United States Patent Office 2,905,608
Patented Sept. 22, 1959

2,905,608
TREATMENT OF CATALYST MATERIALS WITH HIGH ENERGY RADIATIONS

Charles R. Noddings, Midland, William E. Miller, Freeland, and Theodore C. Engelder, Midland, Mich., assignors to The Dow Chemical Company, Midland, Mich., a corporation of Delaware No Drawing. Application December 29, 1955
Serial No. 556,080

6 Claims. (Cl. 204—162)

This invention concerns a method of treating catalyst materials with high energy radiations. It relates more particularly to the treatment of calcium nickel phosphate catalysts with high energy radiations and pertains to improvements in a process for dehydrogenating aliphatic olefins containing from 4 to 6 carbon atoms and having at least 4 carbon atoms in the unsaturated chain of the molecule in the presence of calcium nickel phosphate catalysts to form the corresponding conjugated diolefins, e.g. butadiene-1,3.

Conjugated diolefins such as butadiene, isoprene, dimethylbutadiene, etc., are commonly prepared by dehydrogenating aliphatic olefins, e.g. butenes, 2-methylbutenes of 2,4-dimethylbutenes, in the presence of catalysts. Dehydrogenation catalysts of the calcium nickel phosphate type are well known. They comprise a normal calcium nickel phosphate material which is formed by precipitation from a non-acidic aqueous medium and which contains an average of from 6.5 to 12, usually from 7.5 to 9.2, atoms of calcium per atom of nickel. They may consist entirely of such calcium nickel phosphates, but usually a minor amount, e.g. from 0.05 to 30 and in most instances from 1 to 5 percent by weight, of chromium oxide is admixed therewith as a promoter. The catalytic material usually is pressed into the form of pellets or tablets of sizes convenient for use in carrying out the dehydrogenation reaction. Such catalysts and methods of making the same are described in detail in U.S. Patents Nos. 2,456,367, 2,456,368 and 2,542,813. Methods of using such calcium nickel phosphate catalysts are described in U.S. Patents Nos. 2,442,319 and 2,442,320. Also, Britton et al., in Ind. Eng. Chem., vol. 43, pp. 2871–2874 (1951), describe such calcium nickel phosphate catalysts which are particularly effective for the dehydrogenation of normal butylenes to produce conjugated diolefins, e.g. the dehydrogenation of n-butenes to form butadiene-1,3.

The catalyst material as supplied to the trade in the form of small pellets, usually cylindrical pellets having the dimensions of 3/16 x 3/16 inch, contains a small amount of graphite added to the powdered catalyst as a lubricant to facilitate pelleting of the catalyst, and this graphite must be removed before the catalyst can be used effectively. The graphite can readily be removed from the catalyst pellets by passing a mixture of steam and air over the catalyst or through a bed of the catalyst at temperatures between 350° and 650° C. The catalyst is then in a form suitable for use in dehydrogenating olefins to produce conjugated diolefins. The catalyst when placed in an active condition by removal of the graphite is highly selective for the dehydrogenation of olefins to form diolefins, especially the dehydrogenation of n-butenes to form butadiene-1,3, and can be employed in continuous operation over long periods of time without appreciable change in the selectivity. However, both the activity and the selectivity of such a catalyst are dependent on the care and the skill employed in making the same and on the conditions under which it is used.

During use in a conventional process for the manufacture of butadiene-1,3 from normal butylene, such catalysts have gradually decreased both in activity and in selectivity for the production of butadiene rather than by-products.

In the known method for the production of butadiene from normal butylenes with such a catalyst, superheated steam is passed through a reaction chamber containing a bed of the catalyst to sweep air from the chamber and to bring the catalyst bed to a temperature near that at which the dehydrogenation reaction is carried out. The reaction is preferably carried out at temperatures between 575° and 650° C., but it can be conducted at lower or higher temperatures, e.g. at from 500° to 700° C. After sweeping air from the reaction chamber with the steam, a mixture of one part by volume of hydrocarbon vapors comprising butylenes and from 10 to 20 volumes or more, usually about 20 volumes, of steam, which vapor mixture has been formed at or brought to a temperature suitable for the reaction, is passed through the chamber and the bed of the catalyst therein. The conditions, or vapor flow rate, reaction temperature and proportions of steam present, are usually such as to effect a conversion, i.e. consumption, of from 30 to 35 percent of the normal butylenes per pass through the catalyst bed. The effluent vapor mixture is passed through heat exchangers and other cooling devices to condense the water and hydrocarbons therefrom. The hydrocarbon layer of the condensate is separated from the aqueous layer and is distilled to separate the butadiene product. Unconsumed butylenes are recycled to the process.

During use in the dehydrogenation process, the catalyst gradually accumulates a small amount of carbon or non-volatile organic material and decreases in activity. Accordingly, flow of the hydrocarbon starting material is interrupted from time to time and air admixed with an equal volume or more, usually about six volumes, of steam is passed through the catalyst bed at temperatures between 450° and 700° C. to oxidize and remove the carbonaceous or organic material and thus reactivate the catalyst. The flow of air is then interrupted, the catalyst chamber is swept free of air with steam, and introduction of the olefin-containing starting material in admixture with steam is resumed.

The operations just described are repeated many times over, usually with little or no change in procedure from one cycle to the next, except that the dehydrogenation temperature is gradually raised, because of the decrease in activity of the catalyst, to maintain the butylene conversion at a value between 30 and 35 percent per pass or thereabout. When operating in the manner just described, a bed of the catalyst has been found to have a useful life of from 5 to 7 months of continuous service, during most of which time the selectivity value for the catalyst decreases only gradually and remains high, e.g. at a value corresponding to a yield of from about 85 to 95 percent of butadiene, based on the butylenes consumed. However, toward the end of the period of useful life there is usually a sharp and spontaneous rise in the maximum temperature in the catalyst bed and a large amount of carbon forms in the bed and renders the catalyst unsuitable for further use, or stated differently, lowers the selectivity, or the activity, or both the activity and the selectivity, of the catalyst to a point which renders further use of the catalyst unprofitable. The used catalyst must then be replaced with new catalyst.

It is a primary object of the invention to provide a method of maintaining a calcium nickel phosphate catalyst highly selective for the dehydrogenation of normal olefins containing from 4 to 6 carbon atoms and having at least 4 carbon atoms in the unsaturated chain in the molecule to produce the corresponding conjugated diolefins. Another object is to provide a method of treating a calcium nickel phosphate catalyst to maintain the catalyst highly selective for the dehydrogenation of olefins to produce conjugated diolefins and to prolong the useful life of said catalyst. A further object is to provide a method of treating a calcium nickel phosphate catalyst having a low selectivity for the dehydrogenation of normal butylenes to form diolefins, which treatment results in revivification of the selectivity of said catalyst for converting olefins to diolefins. A specific object is to provide a method of treating a calcium nickel phosphate catalyst for making and maintaining said catalyst highly selective for the dehydrogenation of normal butylenes to form butadiene-1,3. Still another object is to provide improvements in a process for dehydrogenating normal butylenes to produce butadiene. Other and related objects may appear from the following description of the invention.

According to the invention the foregoing and related objects are obtained by subjecting a calcium nickel phosphate catalyst to ionizing irradiation with radiations from high energy sources such as high energy neutrons, gamma rays, X-rays, high energy protons, electrons or helium ions or thermal neutrons, and in amount sufficient to maintain the calcium nickel phosphate catalyst in a condition of high selectivity for the dehydrogenation of normal butylenes to form conjugated diolefins in an amount of at least 75, preferably from 80 to 95, percent based on the butylenes consumed in the reaction.

The term "selectivity" employed herein pertains to the moles of butadiene-1,3 produced per 100 moles of n-butenes consumed in the reaction.

It has been found that a spent or a used calcium nickel phosphate catalyst having its selectivity lowered to a point where the catalyst can no longer be profitably used, e.g. having a selectivity of 70 percent or lower, can readily be revived or converted to a catalyst having a high selectivity for the dehydrogenation of normal butylenes to form butadiene by subjecting the catalyst to irradiations with radiations from high energy sources, especially gamma rays from cobalt 60 or high energy electrons from a Van der Graaff electron machine.

Broadly, the invention concerns the treatment of catalyst materials, especially calcium nickel phosphate catalysts, with ionizing irradiations from high energy sources and pertains to a process for dehydrogenating normal butylenes in the presence of a calcium nickel phosphate catalyst in the conventional manner with the improvement which consists in subjecting the catalyst to a controlled amount of irradiation from high energy sources, e.g., gamma rays, sufficient to make the catalyst highly selective or to maintain the catalyst in a condition of high selectivity for the dehydrogenation of normal butylenes consumed in the reaction into butadiene-1,3 and with little, or no, formation of by-product gas other than the hydrogen which is formed. Such irradiation of the catalyst can be carried out prior to or during the dehydrogenating operations, continuously or intermittently, and at ordinary or elevated temperatures.

The irradiation of a calcium nickel phosphate catalyst with radiations from high energy sources for purpose of revivification of the lowered selectivity of a used or spent catalyst or the irradiation of a new catalyst in place, i.e. in operation in a conventional process for the dehydrogenation of normal butylenes to produce butadiene, for purpose of reviving its selectivity or of maintaining the catalyst in a condition of high selectivity can be carried out in ways known to the art.

The calcium nickel phosphate catalyst to be treated can be subjected to irradiations from neutrons and/or gamma radiations from a nuclear reactor, gamma rays from cobalt 60 or other gamma ray emitting radioisotopes or fission products, or high energy electrons from a Van der Graaff or other electron accelerator by exposing the catalyst to such radiations in the shield of a nuclear reactor, in the presence of cobalt 60 or by exposing a layer of the catalyst to radiations from cobalt 60 or high energy electrons from an electron accelerator.

The calcium nickel phosphate catalyst can be subjected to irradiations from high energy sources while the catalyst is in use by employing a catalyst chamber fitted with one or more, suitably a plurality, of wells or tunnels uniformly spaced throughout the chamber and surrounded by catalyst when the chamber is filled with the same. Rods, bars or elements of cobalt 60 or other gamma ray emitting radioisotope or fission product are positioned in the well or tunnels so as to subject all or a part of the catalyst to irradiations with the gamma rays while carrying out the operations of dehydrogenating normal butylenes to produce butadiene.

Thus, a bed of a calcium nickel phosphate catalyst can be subjected to a controlled and beneficial amount of ionizing irradiation from high energy sources throughout all or a part of the cycle of operations, and the normal butylene reactant is also subjected to such irradiations, and, if desired, the butylene can be subjected to similar irradiation prior to contact of the butylene with the calcium nickel phosphate catalyst.

When a source of gamma rays is used such as for example cobalt 60 or other gamma emitting radioisotopes or fission product and the catalyst is subjected to irradiation in place, i.e. in operation for the dehydrogenation of normal butylenes to form butadiene, the catalyst will ordinarily be at temperatures of from 500° to 700° C. When subjecting only the catalyst to irradiation, the treatment will ordinarily be carried out at room temperature or thereabout, but elevated temperatures can be used.

The amount of irradiation necessary to effect the revivification of the selectivity of a spent or used catalyst or to maintain a new catalyst at a high selectivity value will vary over wide limits and is dependent in part upon such factors as the condition of the catalyst and the intensity of the radiations. A spent catalyst will, of course, require a greater amount of irradiation, i.e. a greater dosage, to revive the selectivity to a high value than is required to revive a used catalyst of only slightly lowered selectivity, e.g. a used catalyst having a selectivity of 70 percent compared to a spent catalyst having a selectivity of 40 percent, or lower. Also, the intensity of irradiation, applied continuously or in intermittent manner, necessary to maintain a new catalyst in a condition of high selectivity in operation or in use is usually less than is required for the revivification of a spent or used catalyst of lower selectivity.

The irradiation of the calcium nickel phosphate catalyst with radiations from high energy sources for purpose of the invention can be carried out with radiations of intensity which may vary from as low as 100 up to 500,000 roentgens, i.e. roentgen equivalent physical (R.E.P.), per hour, or greater. The dosage is dependent upon the time for which the catalyst is subjected to the radiations of a given intensity. A dosage of at least $0.5 \times 10^6$ R.E.P., preferably from $2 \times 10^6$ to $20 \times 10^6$ R.E.P. is usually employed. A convenient dosage which has been found useful in practice is that corresponding to irradiation of the catalyst with gamma rays from cobalt 60 at an intensity of from about 100,000 to 400,000 R.E.P. per hour and a total dosage of at least $2 \times 10^6$, preferably from $2 \times 10^6$ to $20 \times 10^6$, R.E.P., for revivification of a used or spent catalyst. For maintaining a new calcium nickel phosphate catalyst in a condition of high selectivity for the dehydrogenation of n-butenes to produce butadiene, a smaller dosage of lower intensity can be used. The irradiation of the calcium nickel phosphate catalyst can be carried out employing radiations from high energy sources of low intensity over long periods of time or with radiations of relatively high intensity over shorter periods of time as necessary to effect the revivification of the selectivity of the catalyst to a high value or to maintain the selectivity of the catalyst at a high value by overcoming the tendency of the selectivity of the catalyst to otherwise gradually decrease with use.

The following examples illustrate ways in which the principle of the invention has been applied, but are not to be construed as limiting its scope.

*Example 1*

A one inch internal diameter 446-stainless steel tube was filled to a depth of 11 inches with catalyst pellets having the dimension 3/16 x 3/16 inch. Each pellet comprised about 98 percent by weight of calcium nickel phosphate, containing an average of 8.2 atoms of calcium per atom of nickel, and 2 percent of chromium oxide as a promoter. The catalyst employed in the experiment had been previously employed in a process for dehydrogenating normal butylenes to form butadiene until its selectivity was lowered to a point where further use of the catalyst was rendered unprofitable. The bed of the catalyst under test contained 150 cubic centimeters of the used catalyst pellets. A test of the catalyst was started using a one hour operating cycle. In each cycle, butadiene was formed by passing a vapor mixture of one part by volume of normal butenes and about 20 parts of superheated steam into the upper section of the tube and downward through the catalyst bed for a time of 28 minutes. The n-butene of 99.5 percent purity was fed into admixture with the steam at a rate of 300 volumes thereof (calculated as at 0° C. and 760 millimeters absolute pressure) per bed volume of the catalyst per hour. The flow of n-butenes was then interrupted and hydrocarbon vapors were quickly flushed from the bed over a period of 2 minutes by the continued flow of steam. A vapor mixture of one volume of air and about six volumes of superheated steam was then passed downward through the bed for 28 minutes at a rate of 800 volumes of the air per bed volume of the catalyst per hour, for purpose of regenerating the catalyst. The inflow of air was then interrupted and the bed was flushed over a period of 2 minutes by continued flow of the steam. The test as a whole consisted of repeating such operations in the relative order just given for a total of 5 cycles. The temperature, composition and flow rate of vapor feed mixture of n-butenes and steam were such as to cause an approximately 16 per cent conversion, i.e. consumption, of n-butenes per pass through the catalyst bed. In each of the dehydrogenation steps of the process the effluent vapors were cooled, first sufficiently to condense the steam and thereafter to −78° C. to condense the hydrocarbon products. The remaining uncondensed gas was collected and its volume was measured. The condensed hydrocarbon product was collected, weighed and analyzed to determine the amount of butadiene-1,3 and unreacted butenes therein. The volume of the uncondensed gas is of significance since formation of such gas in amount greater than the amount of hydrogen theoretically generated in forming the butadiene can be due only to the occurrence of undesired side reactions and indicates that the catalyst is acting in a wild manner and is non-selective for the formation of butadiene. The test of the spent calcium nickel phosphate catalyst consisted of repeating the operations described above while maintaining the temperature of the mixture of vapors of the n-butene and steam and the catalyst at 650° C., cooling the effluent vapors, collecting the condensed hydrocarbon products, analyzing the same, and measuring the volume of the uncondensed gas. Thereafter, the catalyst at room temperature was subjected to irradiation with gamma rays from cobalt 60 at an intensity of 393,000 R.E.P. per hour for a period of 5 hours giving a total dosage of approximately $2 \times 10^6$ R.E.P. The test was repeated employing the thus-irradiated calcium nickel phosphate catalyst under otherwise similar dehydrogenation conditions. The results of the test of the spent catalyst are reported below under the heading A. The results of the test of the calcium nickel phosphate catalyst after irradiation with gamma rays from cobalt 60 are reported under the heading B. The results of the tests were as follows:

| | A | B |
|---|---|---|
| Condition of catalyst | Used | Irradiated |
| Dehydrogenation temp._____°C__ | 650 | 650 |
| Conversion_____percent__ | 18.8 | 15.5 |
| Selectivity_____do___ | <40 | 83 |
| Gas_____liters__ | 26.2 | 6.1 |

*Example 2*

A used calcium nickel phosphate catalyst similar to that described in Example 1, and having a low selectivity for dehydrogenating n-butene to form butadiene-1,3, was subjected to irradiation at room temperature with gamma rays from cobalt 60 at an intensity corresponding to 378,000 R.E.P. per hour for a total time of 23.5 hours to give a total dosage of $8.9 \times 10^6$ R.E.P. Thereafter the catalyst was tested for its selectivity for dehydrogenating n-butene to form butadiene employing procedure similar to that described in Example 1. After completing this test, the catalyst was subjected to a further amount of irradiation at room temperature with gamma rays from cobalt 60 at an intensity corresponding to 126,000 R.E.P. per hour for a period of 73 hours giving a total dosage of $9.2 \times 10^6$ R.E.P. plus the $8.9 \times 10^6$ R.E.P. and was tesed again. The results of the tests of the irradiated calcium nickel phosphate catalyst were as follows:

| | A | B |
|---|---|---|
| Dosage_____R.E.P__ | $8.9 \times 10^6$ | $18.1 \times 10^6$ |
| Dehydrogenation temp._____° C__ | 650 | 650 |
| Conversion_____percent__ | 13.9 | 16.9 |
| Selectivity_____do____ | 72 | 86.5 |
| Gas_____liters__ | 6.1 | 5.3 |

We claim:

1. In a process for dehydrogenating unsaturated hydrocarbons to form conjugated diolefins, wherein a normal olefin containing from 4 to 6 carbon atoms and having at least 4 carbon atoms in the unsaturated chain in the molecule in admixture, with steam at temperatures between 500° and 700° C. is dehydrogenated in the presence of a calcium nickel phosphate catalyst to form a corresponding conjugated diolefin, the step which consists in carrying out the dehydrogenation in the presence of a calcium nickel phosphate catalyst which has been subjected to ionizing irradiation with gamma rays from cobalt 60 at an intensity of from 100 to 500,000 R.E.P. per hour for a total dosage corresponding to from $0.5 \times 10^6$ to $20 \times 10^6$ R.E.P. to bring the selectivity of said catalyst for dehydrogenating the olefin to produce a conjugated diolefin to a value between 75 and 95 percent, based on the olefin consumed in the reaction.

2. A process according to claim 1, wherein the unsaturated hydrocarbons are n-butenes.

3. A process according to claim 1, wherein the dehydrogenation reaction is carried out at temperatures between 575° and 650° C.

4. A process according to claim 1, wherein the calcium nickel phosphate catalyst contains an average of from 7.5 to 9.2 atoms of calcium per atom of nickel.

5. A process for the revivification of the selectivity of a calcium nickel phosphate catalyst for dehydrogenating a normal olefin containing from 4 to 6 carbon atoms and having at least 4 carbon atoms in the unsaturated chain in the molecule to produce conjugated diolefins, which process comprises subjecting a used calcium nickel phosphate catalyst having a selectivity lower than 70 percent based on the moles of diolefin produced per 100 moles of normal olefin consumed in the reaction, to ionizing irradiations with radiations from high energy sources at an intensity of from 100,000 to 400,000 R.E.P. per hour for a total dosage corresponding to from $2 \times 10^6$ to $20 \times 10^6$ R.E.P.'s to restore the selectivity of said catalyst to a value between 75 and 95 percent.

6. A process according to claim 5, wherein the used catalyst is subject to ionizing irradiation with radiations from cobalt 60 at an intensity between 100,000 and 400,000 R.E.P. per hour for a total dosage corresponding to from $2 \times 10^6$ to $20 \times 10^6$ R.E.P.

References Cited in the file of this patent

FOREIGN PATENTS 665,263  Great Britain _____ Jan. 23, 1952

OTHER REFERENCES

Taylor et al.: "Journal of American Chemical Society," vol. 76 (1954), pages 971–973.

Weisz et al.: "Journal of Chemical Physics," vol. 23 (1955), page 1567 et seq.

Britton et al.: "Ind. & Eng. Chem.," vol. 43 (1951), pp. 2871–2874.